United States Patent [19]

Vanderwerf

[11] 4,436,393
[45] Mar. 13, 1984

[54] DISTORTION CORRECTION FOR AN OVERHEAD PROJECTOR SYSTEM

[75] Inventor: Dennis F. Vanderwerf, Cottage Grove, Minn.

[73] Assignee: Minnesota Mining and Manufacturing Company, St. Paul, Minn.

[21] Appl. No.: 455,425

[22] Filed: Jan. 3, 1983

[51] Int. Cl.$^3$ ............................................. G03B 21/14
[52] U.S. Cl. ................................ 353/38; 353/DIG. 3; 353/102; 353/70
[58] Field of Search .................... 353/70, 69, 38, 98, 353/DIG. 3, DIG. 4, 22, 87, 102, 99, 23, 24; 350/167, 421, 571, 452

[56] References Cited

U.S. PATENT DOCUMENTS

| | | | |
|---|---|---|---|
| 2,999,126 | 9/1961 | Harries et al. | 353/70 X |
| 3,064,523 | 11/1962 | Meltzer | 353/70 X |
| 3,244,069 | 4/1966 | Field | 353/87 |
| 3,511,563 | 5/1970 | Erwin | 353/38 |
| 4,002,408 | 1/1977 | Amma | 353/70 |
| 4,089,599 | 5/1978 | Kuboshima | 353/70 |

Primary Examiner—Harry N. Haroian
Attorney, Agent, or Firm—Donald M. Sell; James A. Smith; David W. Anderson

[57] ABSTRACT

An overhead projector is provided which is able to project a uniformly focused image of a transparency onto a vertical surface at an oblique angle above the horizontal plane without introducing keystone distortion by offsetting a projection lens and its associated mirror from the center of a transparency stage of the projector in the direction of projection and directing light through the transparency and to the projection lens at an angle which is equal to the oblique angle above the horizontal plane at which the image is projected. Light is directed to the projection lens by offsetting the upper lens of a two-element circular Fresnel condensing lens system in the direction of displacement of the projection lens.

4 Claims, 7 Drawing Figures

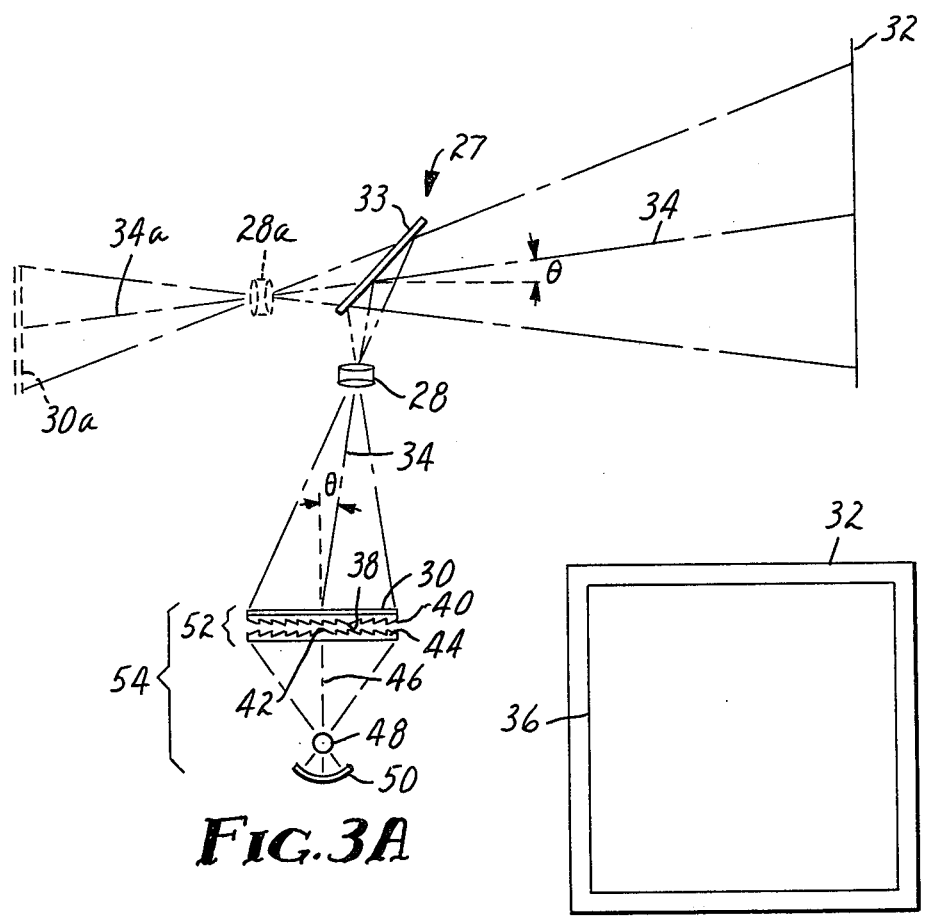
FIG.3A
FIG.3B
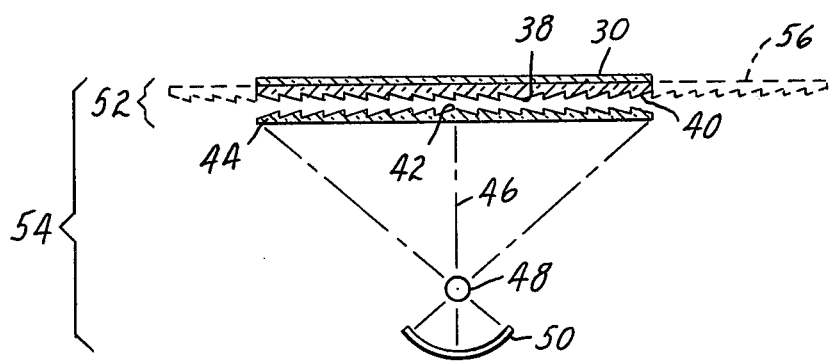
FIG.4

DISTORTION CORRECTION FOR AN OVERHEAD PROJECTOR SYSTEM

BACKGROUND OF THE INVENTION

1. Technical Field of the Invention

This invention relates to overhead projectors and, more specifically, to an improved system of overhead projection which forms an undistorted image on a vertical surface or screen.

2. Brief Description of the Prior Art

Conventional overhead projectors include a stage which supports the transparency to be projected, lighting means mounted below the stage to illuminate the transparency, and a projection lens and mirror combination suspended above the stage to direct the light image of the transparency onto a viewing screen. If the stage and projection lens are in parallel planes; the centers of the projection lens, the stage and the light source are on a common axis; and the mirror is oriented at a 45° angle to the plane of the stage, an undistorted image will be projected on a vertical screen. However, if these conditions are met, at least half of the projected image will be below the level of the mirror and, consequently, the audience's view of the image will be obstructed by the projector.

To provide the audience with an unobstructed view, the mirror is commonly tilted to an angle greater than 45° with respect to the horizontal, thereby raising the projected image above the level of the projector. If the viewing screen remains vertical, this projection of the image at an oblique angle above the horizontal results in a magnification distortion of the image into a trapezoidal shape in which the upper portion of the image is wider than the lower portion. Because of the shape of the projected image, this magnification distortion is commonly referred to as "keystoning".

A second type of distortion common to such projectors is a lack of uniform focus throughout the projected image. This type of distortion will occur unless the so-called Scheimpflug condition is met which requires that the plane of the screen and the planes of the virtual images of the projection lens and the stage be parallel or converge to a common point.

It is claimed that oblique projection of the image may be achieved without introducing either keystone distortion or focus non-uniformity distortion by tilting some of the elements which comprise the projector. U.S. Pat. No. 4,002,408 which issued to Amma on Jan. 11, 1977, for example, discloses two methods by which it is claimed that distortion-free oblique projection may be achieved. The first method involves moving the projection lens and mirror away from the center of the stage toward the screen and tilting the lighting means to project light at an angle through the transparency to the projection lens and mirror. The second method requires that the projection lens and the stage be tilted with respect to the mirror and the illuminating apparatus. Both methods introduce mechanical complexities to the projector and a tilted stage would pose difficulties for the presenter in positioning the transparency on the stage and writing on the transparency as it is being projected.

SUMMARY OF THE INVENTION

An overhead projector according to the present invention is able, by purely optical means, i.e. without tilting any of the components of the system, to project a uniformly focused image onto a vertical screen at an oblique angle above the horizontal plane without introducing keystone distortion.

The foregoing is accomplished by offsetting a projection lens and its associated mirror from the center of a transparency stage of the overhead projector in the direction of projection and directing light through the transparency and to the projection lens at an angle which is equal to the oblique angle above the horizontal plane at which the image is projected. Light is directed to the projection lens by offsetting the upper lens of a two-element annular Fresnel condensing lens system in the direction of displacement of the projection lens.

BRIEF DESCRIPTION OF THE DRAWINGS

FIGS. 3A and 3B illustrate a projection system according to the present invention; 3A being a schematic side view of the projection system and 3B being an elevational view of a projection screen and an image projected on the screen;

FIG. 4 is an enlarged schematic side view of condensing lens elements of the projection system of FIG. 3A in cross-section.

DESCRIPTION OF THE PREFERRED EMBODIMENT

Figure 1A:
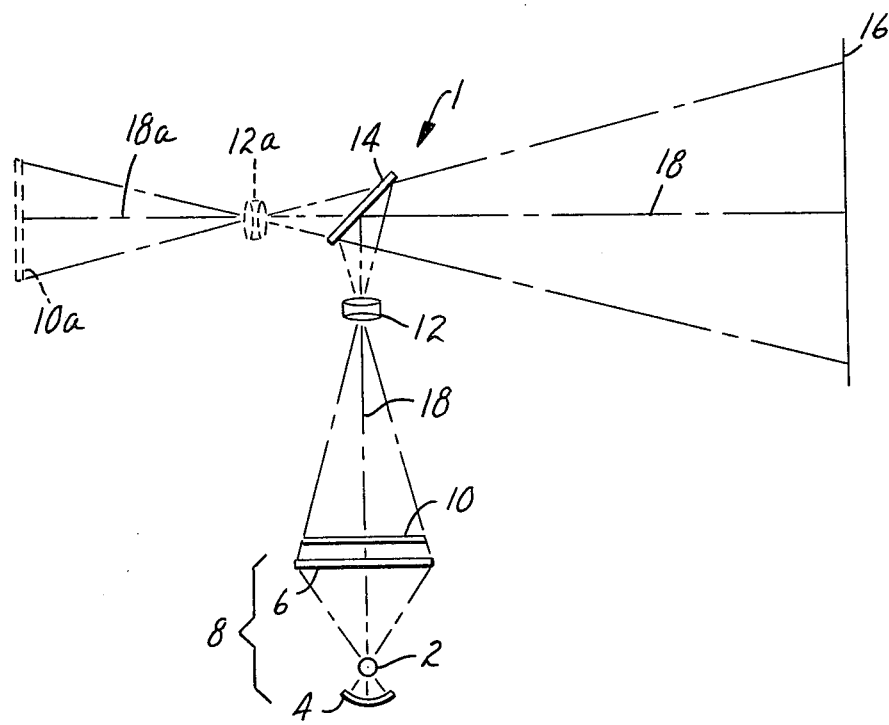
FIGS. 1A and 1B illustrate a prior art system of overhead projection by way of clarification of the principles of this invention; 1A being a schematic side view of the prior system and 1B being an elevational view of a screen and an image projected on the screen.

Appreciation of the fundamental principles of this invention is possible with a clear understanding of a conventional system of overhead projection. In a typical overhead projector 1, illustrated in FIGS. 1A and 1B of the accompanying drawings, a lamp 2 of suitable and conventional type is provided above a concave reflector 4, while a condensing lens system 6, which may be an annular Fresnel lens or a combination of annular Fresnel lenses, is mounted above the lamp 2 so that light emitted by the lamp 2 and the reflector 4 is collected by the condensing lens system 6 centered over the light source and is focused above the lens system 6. All these elements constitute, in combination, lighting means generally indicated by the numeral 8.

Mounted parallel to and above the condensing lens system 6 is a transparent stage 10 upon which is placed a transparency or slide (not shown) to be imaged. The transparency or slide is hereinafter simply referred to as a "transparency" to mean any such picture or light-transmissive material adapted for projection in an overhead projector. A projection lens 12, often consisting of two positive lenses and a single negative lens, is mounted further above the stage 10 along the optic axis of the condensing lens system 6, and a mirror 14 is suitably mounted to intercept light from the projection lens 12 and project an image onto a vertical screen 16.

In the configuration shown in FIG. 1A, the mirror 14 is oriented at a 45° angle to the horizontal plane so the optic axis 18 of the projected image 20 is perpendicular to the stage 10 and the screen 16. This means that the plane of the virtual image of the stage 10a and the plane of the screen 16 are parallel. Since the planes of the virtual image of the stage 10a and the screen 16 are parallel, no magnification distortion of the image 20 will occur. Also, since the planes of the virtual images of the stage 10a and the projection lens 12a, and the plane of the screen 16, are parallel, uniform focus will be achieved throughout the image 20 because the Scheimpflug condition is met. The Scheimpflug condition requires that for the image 20 to be uniformly in focus, the planes of the virtual images of the stage 10a and the projection lens 12a and the plane of the screen 16 must be either parallel or converge to a common point.

Figure 1B:
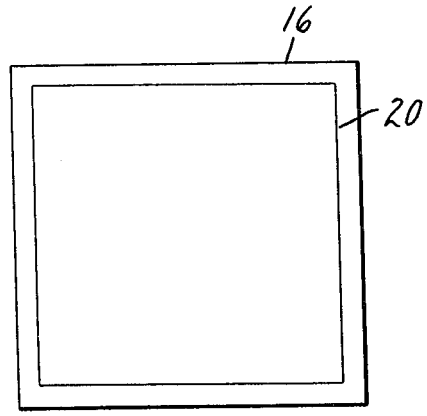

Thus, to avoid distortion of the image 20, as shown in FIG. 1B, it is merely required that the optic axis 18 of the system be projected perpendicularly to the screen 16 by orienting the mirror 14 at a 45° angle to the horizontal plane. This configuration, however, is undesirable because at least a portion of the image 20 will be obscured because the overhead projector 1 is located between the screen 16 and the audience.

Figure 2A:
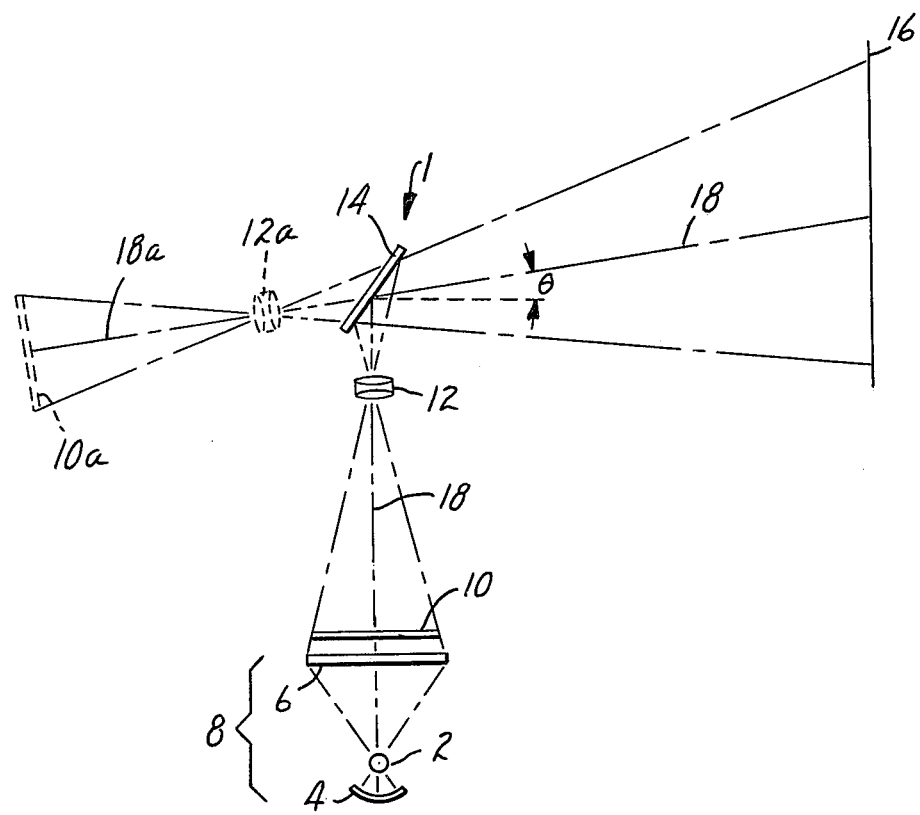
FIGS. 2A and 2B illustrate the effect of oblique projection on the image projected by the system of FIGS. 1A and 1B.

It is, therefore, desirable to raise the level of the image 20 above the level of the overhead projector 1 by tilting the mirror 14 to an angle greater than 45° to the horizontal plane, as shown in FIG. 2A, so that the optic axis 18 of the projected image 20 is projected from the mirror 14 to the screen 16 at an oblique angle "θ" above the horizontal plane. The result of increasing the angle of the mirror 14 is that while the optic axis 18 (and the reflected optic axis 18a) remains perpendicular to the plane of the stage 10 (and the plane of the virtual image of the stage 10a), the optic axis 18 is no longer perpendicular to the screen 16. As a consequence, the plane of the virtual image of the stage 10a and the plane of the screen 16 are no longer parallel.

Figure 2B:
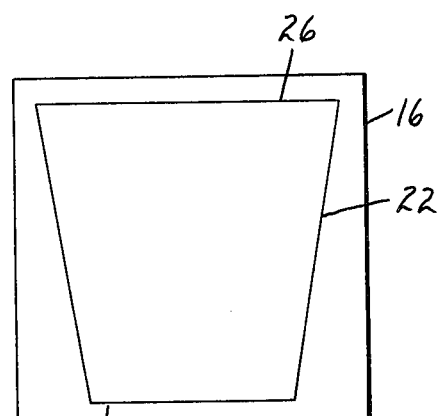

The result of this oblique projection is twofold. First, whenever the plane of the virtual image of the stage 10a and the plane of the screen 16 are not parallel, a magnification distortion is introduced to the projected image 22, as indicated by FIG. 2B, in which the image 22 is increasingly magnified from the bottom 24 of the image 22 to the top 26 of the image 22 to produce a trapezoidal image 22, the shape of which results in this type of distortion being referred to as "keystoning". Second, since the planes of the virtual images of the stage 10a and projection lens 12a and the plane of the screen 16 are neither parallel nor converge to a common point, the Scheimpflug condition is not satisfied and the image 22 will not be uniformly in focus.

FIGS. 3A and 3B illustrate a projection system 27 and an image projected according to the present invention in which the image is projected at an oblique angle above the horizontal plane without producing either of the distortions discussed above, i.e., magnification distortion or focus non-uniformity.

It has been found that distortion will not be introduced if a projection lens 28 is offset from the center of a stage 30 toward a projection screen 32, i.e., in the direction of projection, and the associated mirror 33 is oriented at 45° to a horizontal plane so that the optic axis 34 extends from the stage 30 to the projection lens 28 at an angle "θ" equal to the oblique projection angle of the image above the horizontal plane. Magnification distortion or "keystoning" is not introduced because, as shown in FIG. 3A, the plane of the virtual image of the stage 30a is parallel to the plane of the screen 32. Focus uniformity is maintained throughout the image 36, shown in FIG. 3B, because the projection lens 28 is translated and not rotated with respect to the stage 30. Thus, the Scheimpflug condition is satisfied because the plane of the virtual image of the projection lens 28a is parallel to the plane of the virtual image of the stage 30a and the plane of the screen 32.

Referring to FIGS. 3A and 4, the foregoing inclination of the optic axis 34 is accomplished by off-setting the center 38 of an upper annular Fresnel lens 40 with respect to the center 42 of a lower annular Fresnel lens 44 and the optic axis 46 of a lamp 48 and reflector 50. The upper Fresnel lens 40 and the lower Fresnel lens 44 constitute in combination a condensing lens system 52 which corresponds to the condensing lens system 6 of FIGS. 1A and 2A, and the lamp 48 and the reflector 50 correspond to the lamp 2 and reflector 4 of FIGS. 1A and 2A. The combination of the condensing lens system 52, lamp 48, and reflector 50 constitute a lighting means 54 which corresponds to the lighting means 8 of FIGS. 1A and 2A.

It has been found that if the center 38 of the upper Fresnel lens 40 is offset from the center 42 of the lower Fresnel lens 44 and the optic axis 46 of the lighting means 54, in the same direction as the offset of the projection lens 28 with respect to the vertical optic axis 46 of the lighting means 54, the optic axis 34 of light passing through the stage 30 will be inclined the required angle "θ". As described above, this inclination of the optic axis 34 will permit the projection of an undistorted image 36 at an oblique angle "θ" above the horizontal plane.

The angle "θ" at which an image 36 may be projected free of magnification distortion and distortion due to focus non-uniformity may be varied over a range of values by providing an upper Fresnel lens 40 which is considerably larger, as indicated by phantom lines 56, than the lower Fresnel lens 44 and the stage 30. Such a lens 40 would permit the projection offset angle "θ" to be adjusted by allowing the relative offset of the center 38 of the upper Fresnel lens 40 with respect to the center 42 of the lower Fresnel lens 44, and thus the inclination of the optic axis 34, to be varied. As the relative positions of the upper Fresnel lens 40 and lower Fresnel lens 44 are varied, the projection lens 28 must be repositioned to intercept the optic axis 34 of light exiting the stage 30. The parameters of the lenses 28, 40, and 44 and the dimensions of the projector 27 are selected such that the projection lens 28 will be properly positioned when it is directly over the center 38 of the upper Fresnel lens 40. This relationship between the center 38 of the Fresnel lens 40 and the projection lens 28 is not required for distortion-free projection, however. What is required is that the projection lens 28 and the upper Fresnel lens 40 be offset from the center 42 of the lower Fresnel lens 44 (and the center of the stage 30) in a common direction and that the projection lens 28 be positioned along the optic axis 34 of the light exiting the upper Fresnel lens 40.

If the center 38 of the upper Fresnel lens 40 and the projection lens 28 are positioned directly above the center 42 of the lower Fresnel lens 44, the angle "θ" will be equal to zero and distortion-free projection can only be achieved in the horizontal plane. This condition corresponds to the projection configuration shown in FIG. 1A. As a practical matter, the maximum oblique projection angle is limited to approximately 15°, because of the construction and parameters of the Fresnel lens 40, and the usable field angle of the projection lens 28.

Although no mechanism is shown, it should be apparent that the projection lens 28 and the upper Fresnel lens 40 could be connected together and moved simultaneously by a convenient mechanical linkage. Alternatively, the projection lens 28 and the upper Fresnel lens 40 could be manually positioned by means of suitable horizontal carriages which may or may not be interconnected.

As described above with respect to FIG. 4, a large upper Fresnel lens 40, as indicated by phantom lines 56, could be used to provide a range of oblique projection angles "$\theta$" at which distortion-free projection may be achieved. If it were desired to limit the oblique projection angle to a single value, however, the upper Fresnel lens 40 could be cropped to dimensions which correspond to the lower Fresnel lens 44 and the stage 30. In this situation, adjustment of the angle at which distortion-free projection could be achieved would not be available, but the size and complexity of the overhead projector 27 would be greatly reduced because the upper Fresnel lens 40 would be no larger than the lower Fresnel 44 and provisions to translate the projection lens 28 and the upper Fresnel lens 40 need not be provided.

A specific example of an overhead projector 27 according to the present invention which is designed to project an undistorted image at a predetermined oblique angle above the horizontal plane onto a vertical screen includes two annular Fresnel lenses 40 and 44 which are manufactured of clear acrylic plastic, with a refractive index of 1.491 for yellow light. The width of the individual grooves formed in the surfaces of the lenses 40 and 44 is between 0.010 and 0.020 inches (0.25 and 0.51 mm) and the thickness of each lens 40 or 44 is between 0.050 and 0.100 inches (1.27 and 2.5 mm). The lower Fresnel lens 44 has a focal length of 12.6 inches (320 mm) and the upper Fresnel lens has a focal length of 16.7 inches (424 mm) to yield a combined focal length of 7.2 inches (183 mm). The two Fresnel lenses 40 and 44 are located directly below the stage 30 which is clear glass and has lateral dimensions of 11.2 inches (284 mm) by 11.2 inches (284 mm). The lamp 48 is located 12.6 inches (320 mm) below the lower Fresnel lens 44. Above the stage 30 is located the projection lens 28 which has a focal length of 12.9 inches (328 mm) and a back focus of 14.4 inches (366 mm). The center of the projection lens 28 is vertically spaced from the stage 30 a distance of 15.2 inches (386 mm) to operate at a 5.4X magnification. Both the projection lens 28 and the center 38 of the upper Fresnel lens 40 are horizontally offset from the center 42 of the lower Fresnel lens 44 a distance of 3.25 inches (83 mm). An overhead projector 27 constructed in such a fashion will project a distortion-free image at an oblique angle "$\theta$" above the horizontal plane of 12°, an angle which has been determined to provide comfortable viewing for the audience.

It should be noted that in the above example, which is provided for illustrative purposes only, the projection lens 28 and the upper Fresnel lens 40 are offset an equal distance from the center 42 of the lower Fresnel 44 and the optic axis of the lamp 48 and reflector 50. This is because the parameters of the various elements and the distances between elements are selected so that light traveling from the lower Fresnel lens 44 to the upper Fresnel lens 40 is collimated or parallel. In other words the lamp 48 is located one focal length (12.6 inches or 320 mm) from the lower Fresnel 44 and the center of the projection lens 28 is located one focal length (16.7 inches or 424 mm) from the upper Fresnel lens 40.

Collimated light from the lower Fresnel lens 44 is not a requirement of the projection system described above, but rather is merely a convenient basis around which to design the system. If light exiting the lower Fresnel lens 44 is to be collimated, then it will so happen that the offset of the projection lens 28 and the offset of the center 38 of the upper Fresnel lens 40 will be equal. If light exiting the lower Fresnel lens 44 is divergent or convergent, the offset of the projection lens 28 will be different from the offset of the upper Fresnel lens 40, but will always be in the same direction and the projection lens 28 will always be positioned along the optic axis 34 of the light exiting the upper Fresnel lens 40.

There are situations in which it is actually not desirable for light to be collimated between the Fresnel lenses 40 and 44.

If it is necessary or desirable to change the magnification or focus of the image projected, the projection lens 28 will have to be moved vertically toward or away from the stage 30, always along the inclined optic axis 34. However, because Fresnel lenses are usually non-achromatic, longer wavelength light rays cross the projection lens focusing (horizontal) axis at a greater distance than the shorter wavelength light rays.

When the projection lens 28 is moved closer to the stage 30 to increase image magnification, the longer wavelength light rays are blocked by the entrance aperture of the projection lens 28. A "bluish" color then appears around the border of the projected image. When the projection lens 28 is moved farther from the stage 30 to decrease image magnification, the shorter wavelength light rays are blocked by the exit aperture of the projection lens 28. This causes a "reddish" color to appear around the border of the projected image. This coloring effect is eliminated when the image of the lamp 48 produced by the Fresnel lenses 40 and 44 follows the movement of the projection lens 28. Movement of the lamp 48 causes its image to move and is referred to as "color tuning".

A remarkable property of offsetting the upper Fresnel lens 40 is that the image of the lamp 48 always moves along the optic axis 34 of light exiting the upper Fresnel lens 40 as the lamp 48 moves along the fixed light axis 46 always perpendicular to the plane of the lower Fresnel lens 44. Thus, for any offset of the upper Fresnel lens 40 and, consequently, any oblique projection angle "$\theta$", the projected image can be "color tuned" merely by moving the lamp 48 perpendicularly toward or away from the lower Fresnel lens 44. This movement of the lamp 48 ensures that the transparency will always be symmetrically illuminated. It will be apparent to those skilled in the art that a simple mechanical connection between the projection lens 28 and the lamp 48 could be provided to coordinate the movement of these two elements and provide automatic "color tuning" of the system in response to projection lens 28 movement.

As the lamp 48 moves away from the lower Fresnel lens 44, light rays exiting the lower Fresnel lens 44 become progressively convergent. As the lamp 48 moves toward the lower Fresnel lens 44, exiting light rays become progressively divergent. Thus, to return to the point made earlier, it is not always desirable that the light rays exiting the lower Fresnel lens 44 be collimated. "Color tuning" of the image may require that these light rays either converge or diverge.

When the centers of two annular Fresnel lenses of equal groove frequencies and in close proximity, such as lenses 40 and 44, are displaced, Moire interference patterns are produced which appear as a series of intense radial lines which increase in number as the separation of the centers of the lenses increases. These patterns are projected along with the transparency image and, hence, are undesirable.

This effect can be reduced considerably by selecting different groove frequencies for the upper Fresnel lens 40 and the lower Fresnel lens 44. If the ratio of the groove frequencies of the two Fresnel lenses 40 and 44 is in the range of 1.3 to 1.5, the intensity of the Moire interference patterns is significantly reduced. Specifically, when the groove frequency of the lower Fresnel lens 44 is 3.94 grooves per millimeter, and the groove frequency of the upper Fresnel lens 40 is 2.78 groves per millimeter, the interference pattern is reduced to a very low intensity which is hardly noticeable.

In addition to different groove frequencies, it has been found that a separation between the lenses 40 and 44 of 0.25 inches (6.35 mm) to 0.75 inches (19.1 mm) is desirable to assist in the reduction of interference patterns.

While the present invention has been described in connection with a certain specific embodiment, it is to be understood that it is not to be limited to this embodiment. On the contrary, it is intended to cover all alternatives and modifications falling within the spirit and scope of the invention as set forth in the appended claims.

I claim:

1. An overhead projector for projecting an undistorted image of a transparency onto a vertical projection surface at a selected oblique projection angle above a horizontal plane within a range of oblique projection angles, comprising:

a horizontal transparency stage upon which the transparency to be imaged is placed;

a projection lens having a predetermined optic axis oriented in a vertial plane, said lens being positioned above said stage and offset from the center of said stage toward said projection surface so that said lens will intersect a line extending from the center of said stage and inclined toward said projection surface at an angle with respect to a vertical plane equal to said selected oblique projection angle;

means for illuminating said transparency including a light source disposed below said stage and having a predetermined optic axis oriented in a vertical plane and intersecting the center of said stage;

means disposed between said means for illuminating said transparency and said stage for redirecting light produced by said light source to said projection lens at said angle to a vertical plane equal to said selected oblique projection angle including a first annular Fresnel lens parallel to said stage and having a predetermined optic axis oriented in a vertical plane and coincident with said optic axis of said light source and disposed between said light source and said stage, and a second annular Fresnel lens parallel to said stage and having a predetermined optic axis oriented in a vertical plane and displaced from said optic axis of said first annular Fresnel lens and said optic axis of said light source in the direction of said offset of said projection lens, and first and second annular Fresnel lenses cooperating to focus light produced by said light source at said offset position of said projection lens; and a mirror disposed adjacent said projection lens for reflecting light exiting said projection lens toward said projection surface at said oblique projection angle.

2. An overhead projector according to claim 1 wherein said second annular Fresnel lens is horizontally movable with respect to said stage to vary said angle at which said light produced by said light source is redirected to said projection lens so that undistorted projection may be achieved within the range of oblique projection angles.

3. An overhead projector according to claim 1 wherein said first and second annular Fresnel lenses are thin sheets of light-transmissive material and include planar major surfaces and opposite grooved major surfaces and wherein said grooved surfaces are disposed adjacent each other.

4. An overhead projector according to claim 1 wherein said optic axis of said second annular Fresnel lens is disposed vertically below said projection lens.

* * * * *